United States Patent [19]

Overs

[11] 4,409,827
[45] Oct. 18, 1983

[54] COMBINED MARINE INSTRUMENT AND DISPLAY THEREFOR

[76] Inventor: Ronald R. Overs, E. Amherst, N.Y.

[21] Appl. No.: 343,012

[22] Filed: Jan. 26, 1982

[51] Int. Cl.³ ............................................. G01C 21/10
[52] U.S. Cl. ........................................ 73/181; 73/301
[58] Field of Search ............... 73/181, 182, 183, 184, 73/185, 187, 431, 301, 432 A; 116/300, 26, DIG. 43, 62.4; 114/144 RE; 340/851, 850

[56] References Cited

U.S. PATENT DOCUMENTS

| | | | |
|---|---|---|---|
| 1,354,832 | 10/1920 | Jung | 73/183 |
| 3,127,864 | 4/1964 | Bentkowsky et al. | 114/144 R |
| 3,364,739 | 1/1968 | Foster | 73/183 |

FOREIGN PATENT DOCUMENTS 561839  4/1957  Italy ................................. 116/62.4

*Primary Examiner*—Donald O. Woodiel
*Attorney, Agent, or Firm*—Allen J. Jaffe

[57] ABSTRACT

A combined knotmeter, distance/log meter and depth meter including a meter housing, a dial face having indicia symmetrically centered thereabout, an analog speed indicator having a pointer for cooperating with the indicia; upper and lower openings in the dial face in alignment with digital log and depth meters of the electro-mechanical and LCD-type, respectively; the upper opening interrupting the indicia centered about a twelve o'clock position and actuators for the indicators responsive to sensed variables of speed, distance and water depth.

9 Claims, 3 Drawing Figures

COMBINED MARINE INSTRUMENT AND DISPLAY THEREFOR

SUMMARY OF THE INVENTION

The present invention relates to marine instruments and, more particularly, to a combined knotmeter, log or distance meter and depth sounder including a single, integrated display unit therefor.

Knotmeters, log or distance meters and depth sounders are well known marine instruments for indicating, respectively, the speed, the accumulated distance traveled (in total miles or knots) and the depth to bottom of marine vessels. However, it is common practice to house these instruments in separate and adjacent casings whereby one has to view at least two separate indicators or displays to become aware of the abovementioned measured variables.

In accordance with the teachings of the present invention a single casing is provided to house an integrated face plate or display such that at a glance thereat the viewer is immediately apprised of all three measured variables. The arrangement is compact, efficient, accurate and aids in promoting safety, in that decisions regarding corrective action can be made and implemented more expeditiously than if one had to glance at separate instruments.

Further, the displayed information is formatted in such a manner that is completely consistent with the commonly displayed formats of existing, nonintegrated units. That is to say, the knotmeter portion of the display comprises an analog-type format employing indicia symmetrically arrayed about the periphery of the indicator face with which the pivotting pointer of a meter movement coacts; the log or distance indicating portion of the display comprises a digital, odometer-type display formatted to occupy an area of the indicator face that would be substantially centered at the "twelve o'clock" position of a clock face; and the depth indicating portion of the display comprises an electronic digital read-out located at substantially the "six o'clock" position of a clock face.

It will become apparent, from the ensuing detailed description of the invention, that the displayed functions are formatted in such a manner as to be psychologically compatible with the habits and reflexes of the users thereof. Thus, if one is familar with the separate, nonintegrated units, he will become immediately familar with the integrated unit of the present invention.

The combined marine instrument of the present invention further includes suitable sensors or transducers for developing signals that are proportional to the sensed variables and suitable circuit means for controlling and modifying these signals to drive the meters within the integrated instrument head or casing for display, in accordance with their respective formats, as will become apparent hereinbelow.

Essentially, then, the present invention provides a combined knotmeter, distance meter and depth meter including first sensing means for developing a first signal as a function of the speed of a marine vessel; first control circuit means for developing speed and distance output signals; means for developing a second signal proportional to the distance between said vessel and the bottom of a body of water that the vessel is floating upon; second control circuit means for developing a water depth output signal; an integrated meter housing including a dial face; first, second and third indicators supported by said housing and visible through said dial face; and first, second and third actuators for respectively driving said first, second and third indicators in response to said respective speed, distance and depth output signals.

BRIEF DESCRIPTION OF THE DRAWINGS

For a fuller understanding of the present invention and its characterizing features reference should now be made to the following detailed description thereof taken in conjunction with the accompanying drawings, wherein.

DETAILED DESCRIPTION OF THE PREFERRED EMBODIMENT

Figure 1:
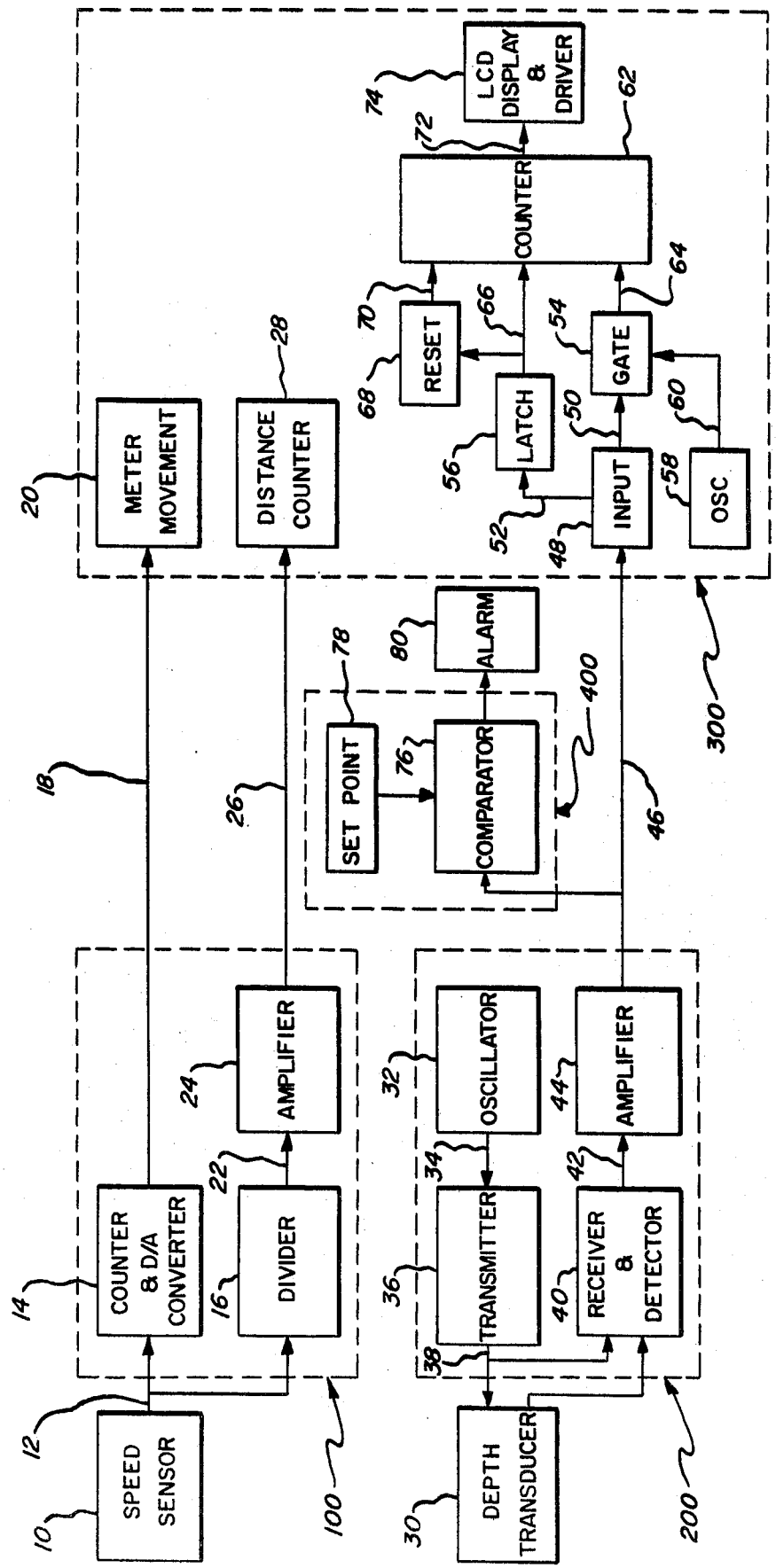
FIG. 1 is a functional flow diagram, in block form, depicting primarily the electronic components of the present invention.

Referring in detail to the drawings and, more particularly, to FIG. 1 the combined instrument of the present invention includes three major circuit components. Namely, those housed within a knotmeter control box 100; those housed within a depth sounder control box 200; and those housed within an instrument or read-out head 300. A fourth component, such as an alarm control box 400 may be provided, as will become apparent hereinbelow.

Suitable speed sensing means 10, which may be mounted to the hull of a marine vessel, develops a pulse signal in response to the speed thereof which signal is delivered via line 12 to a combined counter and digital to analog converter 14 and to suitable dividing circuitry 16. The speed sensor 10 may comprise any well known unit such as, for example, a magnet-affixed turbo wheel and a pulse generating mechanism of the type disclosed in my prior U.S. Pat. No. Re. 28, 839; other types of sensors may be employed. The circuit 14 counts the pulses from sensor 10 and converts them to an analog or varying amplitude signal which is fed, via line 18, as a speed or knot signal to actuate the meter movement 20 within instrument head 300.

Divider 16 may comprise a variable divider circuit which functions to reduce the pulses from sensor 10 to pulse signals that are a function of total distance travelled. These signals are fed via line 22 to a suitable line driver or amplifier 24, which increases the peak values thereof for transmission over line 26 to a remotely located distance counter 28 within head 300. Conductor 28 may be a conventional electrode-mechanical register to indicate total or accumulated distance travelled by the marine vessel. Although not illustrated, a suitable circuit may be connected to counter 14 for variable adjustment of the speed range to which meter movement 20 is responsive.

A depth transducer 30, which may comprise a sounder-type device of known construction, is suitably mounted to the hull of the marine vessel and functions to convert an input electrical signal to a sound wave which is transmitted to the water bottom or any other object below the surface thereof and is reflected back as an echo signal that is reconverted to an output electrical signal. More specifically, an oscillator 32 delivers a sync signal via line 34 to trigger a transmitter 36, which delivers a high frequency signal, via line 38, sufficient to drive transducer 30, as is well known. This signal is also fed to a receiver and detector circuit 40, which develops a pulse; the width of which being a function of the round-trip time of the transmitted and reflected or echo signal of the transducer 30 and, thus, a function of the water depth. The depth signal is fed via line 42 to a suitable amplifier or line driver 44 which functions to increase the value thereof to compensate for line losses as the same is remotely fed to the instrument head 300 via line 46. Although not illustrated, a signal or pulse extender circuit may be provided in line 46 to adjustably compensate for the installed position of transducer 30 below the water level.

Suitable circuit elements are located within head 300 to convert the signal on line 46 into a digital read-out in terms of depth. To this end, an input or pulse shaping circuit 48 is provided which functions to eliminate imperfections and variations in the shape of the output signal from amplifier 44 and to convert the same into a nearly pure pulse at the output 50 and 52 thereof for delivery to gate and latch circuits 54 and 56, respectively. This pulse in line 50 "opens" the gate 54 to permit a pulse train to be delivered from oscillator 58, via line 60, to the accumulator portion of a counter 62, via line 64. At the completion of the signal cycle in line 52 the latch circuit 56 triggers, via line 66, the transfer of the data or pulses in the accumulator portion of counter 62 to the memory portion thereof. The reset circuit responds to the end of each latch cycle and functions, via line 70, to reset the counter accumulator for the next cycle. The data from counter memory is fed, via line 72, to a LCD driver 74 or the like which causes a corresponding digital display in the head 300 to read-out the water depth.

The circuitry in the alarm control box 400 may include a comparator 76 which functions to compare the signal in line 46, representative of water depth, with a reference or set point signal from set point circuit 78 to develop a difference signal. An alarm 80 or the like is actuated whenever this difference signal exceeds predetermined limits, as would indicate shallow water conditions.

Figure 2:
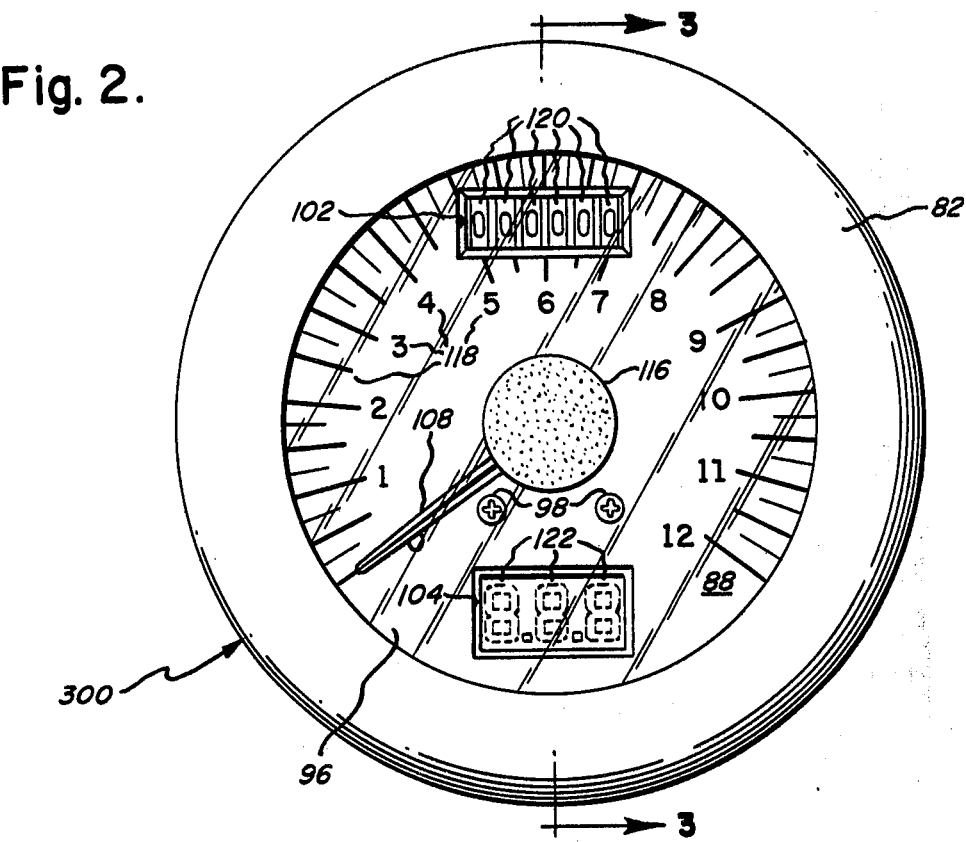
FIG. 2 is a front view of the combined instrument depicting the manner in which the indicator display is formatted.
Figure 3:
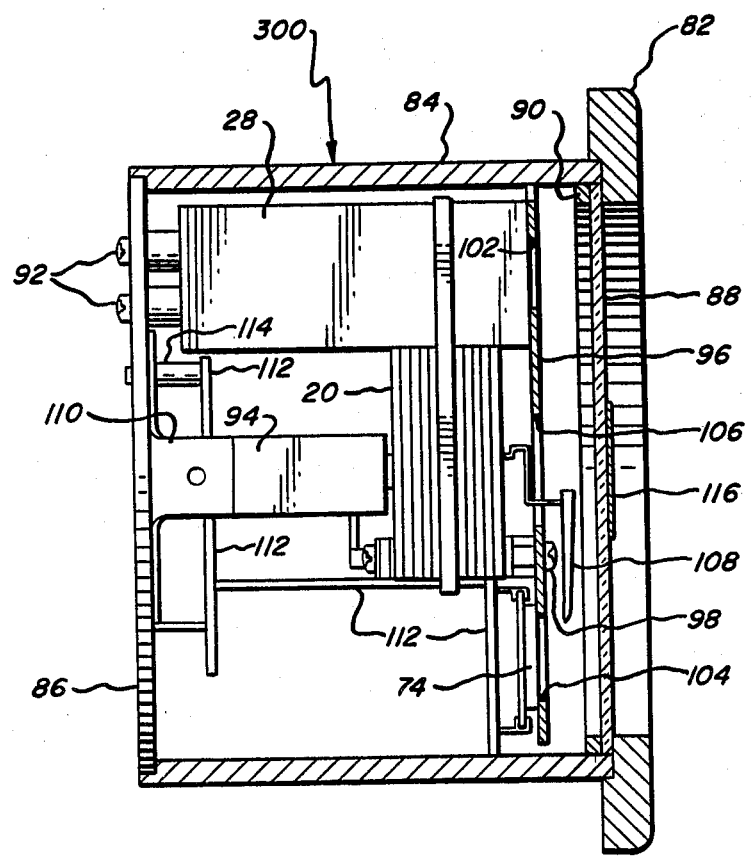
FIG. 3 is a sectional view taken substantially along line 3—3 of FIG. 2, depicting, in side elevation, the major components within the instrument casing.

Referring, now, to FIGS. 2 and 3, the instrument head or housing 300 includes an annular bezel 82, a substantially cylindrical casing 84 and a rear or back support panel or plate 86. The casing 84 is suitably secured to the rear face of bezel 82 by press-fit or the like and surrounds a transparent crystal 88, fabricated of glass or plastic. Crystal 88 may be suitably affixed, as by adhesive, to the rear face of bezel 82 and at its periphery to the forwardmost interior wall of casing 84. A suitable seal ring or the like 90 may be provided to keep the casing watertight.

The electro-mechanical register 28 is suitably secured to the rear panel 86 at 92, as is the meter movement 20, by means of one or more brackets 94. A face plate or face dial 96 is suitably secured as at 98 to the meter movement 20. Face dial 96 contains an upper rectangular opening 102 in alignment with the numerals of register 28, a lower rectangular opening 104 in alignment with the LCD display 74 and a central circular opening 106 that permits meter movement pointer 108 to pass therethrough. The arrangement is such that all the components within casing 84 are supported by and removable with the rear panel 86 which is provided with a pair of tabs or ears 110 (only one of which being illustrated) for attachment to casing 84. The LCD display and driver circuitry 74 may be supported by printed circuit boards 112 which are, similarly secured to rear panel 86 as at 114. A suitable covering which may take the form of a circular piece of tape 116 is affixed to glass 88 to provide a decorative cover to obstruct from front view the parts internal of casing 84.

The front surface of dial 96 is provided with a plurality of radial lines and indicia 118 symmetrically arrayed about the periphery thereof which coact with pointer 108 to present a visual indication, in analog form, of the speed or knots of the marine vessel. The opening 102 in dial 96 is substantially centered about the "twelve o'clock" poisition of a clockface, interupting the radial indicia lines 118 in the vicinity thereof and enables the digits 120 of the electromechanical register 28 to be observed to thereby provide an indication of accumulated knots or mileage. Similarly, the lower opening 104 is centered about the "six o'clock" position of a clockface to enable the LCD segments 122 to be observed to present an indication of water depth.

Although the bezel 82, the casing 84, and the dial face 96 have been depicted as being circular, it should be understood that other shapes such as oval or square would suffice.

From the foregoing, it should be apparent that the instrument of the present invention accomplishes its stated objectives of providing a single, integrated assembly wherein the speed or knots, the accumulated distance and the water depth indicator are formatted in such a manner that the same can be quickly and easily observed with but a single glance at the dial face.

Although a preferred embodiment of the present invention has been disclosed and described, changes will obviously occur to those skilled in the art. It is, therefore, intended that the invention should be limited only by the scope of the appended claim.

What is claimed is:

1. A combined knotmeter, distance/log meter and depth meter comprising:
   first sensing means for developing a first signal as a function of the speed of a marine vessel;
   first control circuit means for developing a speed and distance output signal in response to said first signal;
   second circuit means for developing a second signal as a function of water depth;
   second control circuit means responsive to said second signal for developing a water depth output signal;
   an integrated meter housing including a dial face;
   first, second and third indicators supported by said housing and visible through said dial face;
   first, second and third actuators for respectively driving said first second and third indicators in response to said respective speed, distance and depth output signals;
   said housing includes a casing and a rear panel removably attached to said casing; and
   said first, second and third indicators are supported by said rear panel for movement therewith.

2. The device according to claim 13, wherein:
   said first indicator includes a pointer mounted for pivotal movement and there is provided on said dial face a plurality of indicia symmetrically arrayed about the center thereof for coaction with said pointer;

said second indicator includes a digital display in alignment with an upper portion of said dial face; and said third indicator includes a digital display in alignment with a lower portion of said dial face.

3. The device according to claim 2, wherein:
said upper portion is centered about substantially the twelve o'clock position of a clock face; and
said lower portion is centered about substantially the six o'clock position of a clock face.

4. The device according to claim 3, wherein:
said second indicator comprises an electromechanical register;
said third indicator comprises an LCD display; and
said dial face includes openings in said upper and lower portions in respective alignment with said register and said LCD display.

5. The device according to claim 4, wherein:
said opening in said upper portion interrupts the indicia on said dial face.

6. A combined knotmeter, distance/log meter and depth meter, including:
a meter housing including a dial face having indicia thereon symmetrically arrayed about the center thereof;
first, second and third indicators mounted in said housing;
said first indicator includes a pointer mounted for pivotal movement and cooperating with said indicia to provide an anolog indication of the speed of a marine vessel;
said second indicator includes a digital display in alignment with an upper portion of said dial face to provide a digital indication of the accumulated distance travelled by the marine vessel;
said third indicator includes a digital display in alignment with a lower portion of said dial face to provide a digital indication of the water depth below said marine vessel;
said housing includes a casing and a rear panel removably attached to said casing; and
said first, second and third indicators are supported by said rear panel for movement therewith.

7. The device according to claim 6, wherein:
said upper portion is centered about substantially the twelve o'clock position of a clock face;
said lower portion is centered about substantially the six o'clock position of a clock face; and
said dial face includes openings in said upper and lower portions in alignment with digital displays.

8. The device according to claim 7, wherein:
said opening in said upper portion interrupts the indicia on said dial face.

9. The device according to claim 6, wherein:
said dial face is supported by said rear panel for movement therewith.

* * * * *